(12) United States Patent
Takahashi

(10) Patent No.: US 11,599,347 B2
(45) Date of Patent: Mar. 7, 2023

(54) INFORMATION PROCESSING DEVICE AND DEPLOYMENT LOCATION DETERMINING PROGRAM

(71) Applicant: FUJITSU LIMITED, Kawasaki (JP)

(72) Inventor: Akane Takahashi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/238,246

(22) Filed: Apr. 23, 2021

(65) Prior Publication Data

US 2022/0012031 A1 Jan. 13, 2022

(30) Foreign Application Priority Data

Jul. 8, 2020 (JP) .............................. JP2020-117527

(51) Int. Cl.
*G06F 8/60* (2018.01)
(52) U.S. Cl.
CPC ...................................... *G06F 8/60* (2013.01)
(58) Field of Classification Search
CPC ........................................................ G06F 8/60
See application file for complete search history.

(56) References Cited

U.S. PATENT DOCUMENTS

| | | | | |
|---|---|---|---|---|
| 9,032,248 B1 * | 5/2015 | Petty | ................... | G06F 11/2023 714/13 |
| 2003/0037254 A1 * | 2/2003 | Fischer | ..................... | G06F 9/54 709/248 |
| 2006/0005195 A1 * | 1/2006 | Uchikawa | ............. | G06F 9/4411 718/100 |
| 2006/0179061 A1 | 8/2006 | D'Souza et al. | | |
| 2015/0082298 A1 * | 3/2015 | Wang | ........................ | G06F 8/60 717/174 |

(Continued)

FOREIGN PATENT DOCUMENTS

| CN | 104094256 B | * | 9/2017 | ............... G06F 8/60 |
|---|---|---|---|---|
| CN | 105824614 B | * | 5/2019 | ............... G06F 8/60 |

(Continued)

OTHER PUBLICATIONS

Ciuffoletti, "Automated deployment of a microservice-based monitoring infrastructure", 2015, Elsevier B.V. (Year: 2015).*

(Continued)

*Primary Examiner* — Wei Y Zhen
*Assistant Examiner* — Junchun Wu
(74) *Attorney, Agent, or Firm* — Fujitsu Patent Center

(57) ABSTRACT

An information processing device of deploying containers on a plurality of physical machines includes: memory configured to store operation history information, the operation history information corresponding to each of the containers deployed on the plurality of physical machines; and processor circuitry coupled to the memory, the processor circuitry being configured to perform processing, the processing including: in response that a first container is to be deployed, identifying from the operation history information a reason why the first container is to be deployed; and determining a physical machine from among the plurality of physical machines by using the reason identified to use the determined physical machine as a target physical machine on which the first container is to be deployed.

16 Claims, 22 Drawing Sheets

(56) References Cited

U.S. PATENT DOCUMENTS

| | | | | |
|---|---|---|---|---|
| 2016/0070602 A1* | 3/2016 | Shimogawa | ............ | G06F 9/505 |
| | | | | 718/1 |
| 2016/0103661 A1* | 4/2016 | Meigen | ..................... | G06F 8/20 |
| | | | | 717/104 |
| 2016/0357464 A1 | 12/2016 | Suzuki et al. | | |
| 2017/0052772 A1* | 2/2017 | Chen | .................. | G06F 9/45558 |
| 2018/0004764 A1* | 1/2018 | Sudarsanam | ......... | G06F 16/178 |
| 2018/0287881 A1* | 10/2018 | Kuromatsu | ............ | G06F 9/455 |
| 2018/0322437 A1* | 11/2018 | McClory | ................... | G06F 8/30 |
| 2020/0026431 A1* | 1/2020 | Cherian | .................. | G06F 3/065 |
| 2022/0012031 A1* | 1/2022 | Takahashi | ................. | G06F 8/60 |
| 2022/0229649 A1* | 7/2022 | Myers | ....................... | G06F 8/63 |

FOREIGN PATENT DOCUMENTS

| | | | | |
|---|---|---|---|---|
| JP | 2008-530658 A | 8/2008 | | |
| JP | 2013-069189 A | 4/2013 | | |
| WO | WO-2008015730 A1 * | 2/2008 | ............. | G06F 11/22 |
| WO | 2015/198440 A1 | 12/2015 | | |

OTHER PUBLICATIONS

Steenken et al., "Container terminal operation and operations research—a classification and literature review", 2004, Springer-Verlag (Year: 2004).*

Pahl et al., "Containers and Clusters for Edge Cloud Architectures—a Technology Review", 2015, IEEE (Year: 2015).*

Ma et al., "Efficient Live Migration of Edge Services Leveraging Container Layered Storage", Sep. 2019, IEEE vol. 18, No. 9 (Year: 2019).*

* cited by examiner

FIG. 13

| CONTAINER | STORAGE (PHYSICAL) | SERVER (STORAGE) |
|---|---|---|
| 3a | 5a | 2a |
| 3c | 5b | 2b |
| 3d | 5c | 2d |
| 3e | 5c | 2d |

FIG. 14

| CONTAINER | SERVER (CONTAINER) | STORAGE |
|---|---|---|
| 3a | 2a | 4a |
| 3b | 2a | 4b |
| 3c | 2b | 4c |
| 3d | 2c | 4d |
| 3e | 5c | 4e |

FIG. 15

| STORAGE (VIRTUAL) | STORAGE (PHYSICAL) | SERVER (STORAGE) |
|---|---|---|
| 4a | 5a | 2a |
| 4b | 5b | 2b |

FIG. 16

| CONTAINER | STORAGE (PHYSICAL) | SERVER (STORAGE) |
|---|---|---|
| 3a | 5a | 2a |
| 3c | 5b | 2b |
| 3d | 5c | 2d |
| 3e | 5c | 2d |
| <u>3b</u> | <u>5b</u> | <u>2b</u> |

FIG. 17

| SERVICE | FLAG |
|---|---|
| AAA | ON |
| BBB | ON |
| CCC | OFF |
| DDD | ON |
| EEE | ON |

FIG. 18

| CHARACTER STRING (1) | CHARACTER STRING (2) |
|---|---|
| No such file or directory | WT_PANIC |
| No such file or directory | BACKTRACE |
| ... | ... |

FIG. 20

2020-02-12T05:11:40.194+0000 E STORAGE  [thread595] WiredTiger error (-31804) [1581484300:194813][1:0x7f376c30a700], log-server: __wt_panic, 490: the process must exit and restart: WT_PANIC: WiredTiger library panic Raw: [1581484300:194813][1:0x7f376c30a700], log-server: __wt_panic, 490: the process must exit and restart: WT_PANIC: WiredTiger library panic  — 131c 2020-02-12T05:11:40.202+0000 F -        [thread595] Got signal: 6 (Aborted).
0x55569dd05341 0x55569dd04bd6 0x55569dd04b3e 0x55569bf27ac0 0x55569c35a80b 0x55569bf3487a 0x55569bf34cde 0x55569c3e05ff 0x55569c1dc2f1 0x55569bf27ac0 0x55569c35a80b 0x55569bf3487a 0x55569bf34cde 0x55569c3e05ff 0x7f3773c126db 0x7f377393b88f
----- BEGIN BACKTRACE -----
...
----- END BACKTRACE -----  — 131d

INFORMATION PROCESSING DEVICE AND DEPLOYMENT LOCATION DETERMINING PROGRAM

CROSS-REFERENCE TO RELATED APPLICATION

This application is based upon and claims the benefit of priority of the prior Japanese Patent Application No. 2020-117527, filed on Jul. 8, 2020, the entire contents of which are incorporated herein by reference.

FIELD

The embodiment discussed herein is related to an information processing device and a deployment location determining program.

BACKGROUND

In recent years, there has been progress in the application of a container virtualization technology that simplifies recovery from failures and distributes the processing load by packaging, into containers, applications executed in order to provide services and combining such containers.

Such a container virtualization technology is implemented by deploying a container that does not include a kernel. Therefore, the container virtualization technology can thus reduce the amount of physical resources used as compared with a virtualization technology using a virtual machine (VM) (hereinafter also referred to as a VM virtualization technology).

Accordingly, in recent years, there has been an active shift from an information processing system using the VM virtualization technology to an information processing system using the container virtualization technology (see, for example, Patent Documents 1 to 3).

Examples of the related art include International Publication Pamphlet No. WO 2015/198440, Japanese National Publication of International Patent Application No. 2008-530658, and Japanese Laid-open Patent Publication No. 2013-069189.

Here, in the Information processing system using the containers as described above, a physical machine on which each container is deployed may be different from a physical machine on which a storage accessed by each container is mounted.

Therefore, for example, when a new container is deployed (added) due to a change in the container configuration, a failure, or the like, and the new container and another container are to perform data synchronization, an application that runs in the other container has to read data accessed by the other container from a storage before the data synchronization is performed between the other container and the new container, for example. Also, in this case, an application that runs in the new container has to re-transfer the data transferred from the other container to a storage accessed by the new container after the data synchronization is performed between the other container and the new container, for example.

As a result, the information processing system using the containers may not complete the data synchronization associated with the deployment of the new container within a desired time, and may take a long time to change the container configuration or recover from a failure.

Accordingly, in one aspect of this disclosure described below, there provided is a solution enable a reduction in time for data synchronization associated with the deployment of a new container.

SUMMARY

According to an aspect of the embodiments, An information processing device of deploying containers on a plurality of physical machines includes: memory configured to store operation history information, the operation history information corresponding to each of the containers deployed on the plurality of physical machines; and processor circuitry coupled to the memory, the processor circuitry being configured to perform processing, the processing including: in response that a first container is to be deployed, identifying from the operation history information a reason why the first container is to be deployed; and determining a physical machine from among the plurality of physical machines by using the reason identified to use the determined physical machine as a target physical machine on which the first container is to be deployed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 illustrates a specific example of association information;

FIG. 14 illustrates a specific example of management information;

FIG. 15 illustrates a specific example of connection information;

FIG. 16 illustrates a specific example of the association information;

FIG. 17 illustrates a specific example of application information;

FIG. 18 illustrates a specific example of event information;

FIG. 20 illustrates a specific example of the operation history information;

DESCRIPTION OF EMBODIMENT

[Configuration of Information Processing System]

Figure 1:
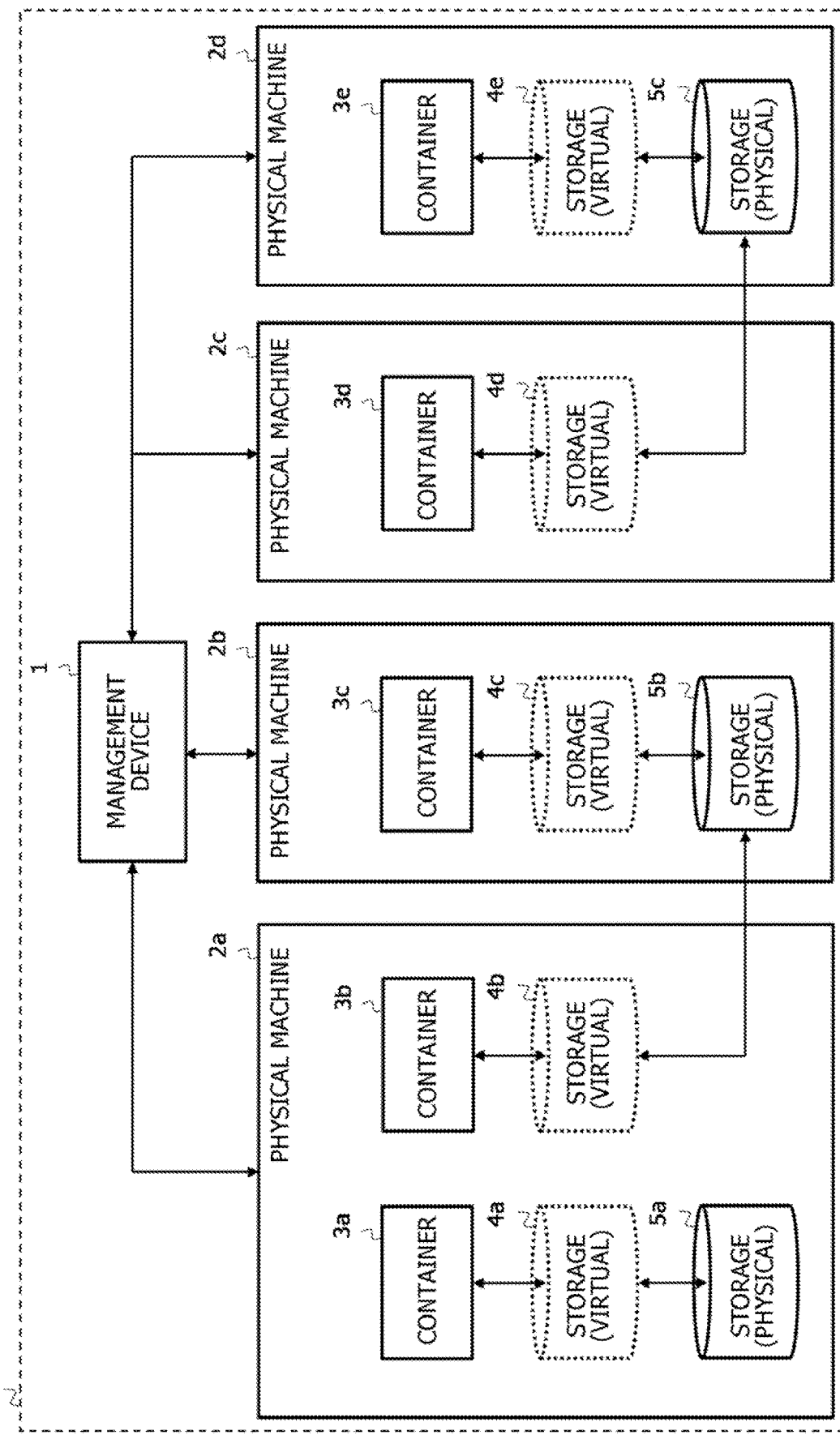
FIG. 1 illustrates a configuration of an information processing system.

First, a configuration of an information processing system 10 will be described. FIG. 1 is a diagram illustrating the configuration of the information processing system 10.

The information processing system 10 illustrated in FIG. 1 includes a management device 1 (hereinafter also referred to as an information processing device 1) and physical machines 2a, 2b, 2c, and 2d.

Moreover, containers 3a and 3b are run on the physical machine 2a, a container 3c is run on the physical machine 2b, a container 3d is run on the physical machine 2c, and a container 3e is run on the physical machine 2d.

Also, the containers 3a, 3b, 3c, 3d, and 3e access virtual storages 4a, 4b, 4c, 4d, and 4e, respectively. Note that in the example illustrated in FIG. 1, the physical entity of the virtual storage 4a is a storage 5a mounted on the physical machine 2a, the physical entity of each of the virtual storages 4b and 4c is a storage 5b mounted on the physical machine 2b, and the physical entity of each of the virtual storages 4d and 4e is a storage Sc mounted on the physical machine 2d.

Hereinafter, the physical machines 2a, 2b, 2c, and 2d are also collectively referred to as physical machines 2, the containers 3a, 3b, 3c, 3d, and 3e are also collectively referred to as containers 3, the virtual storages 4a, 4b, 4c, 4d, and 4e are also collectively referred to as virtual storages 4, and the storages 5a, 5b, and Sc are also collectively referred to as storages 5.

Moreover, the management device 1 is, for example, one or more physical machines or virtual machines and performs a determination or the like of the deployment location of the containers 3 among the physical machines 2. Hereinafter, a specific example of the configuration of the containers 3 will be described.

[Specific Example of Configuration of Container]

Figure 2:
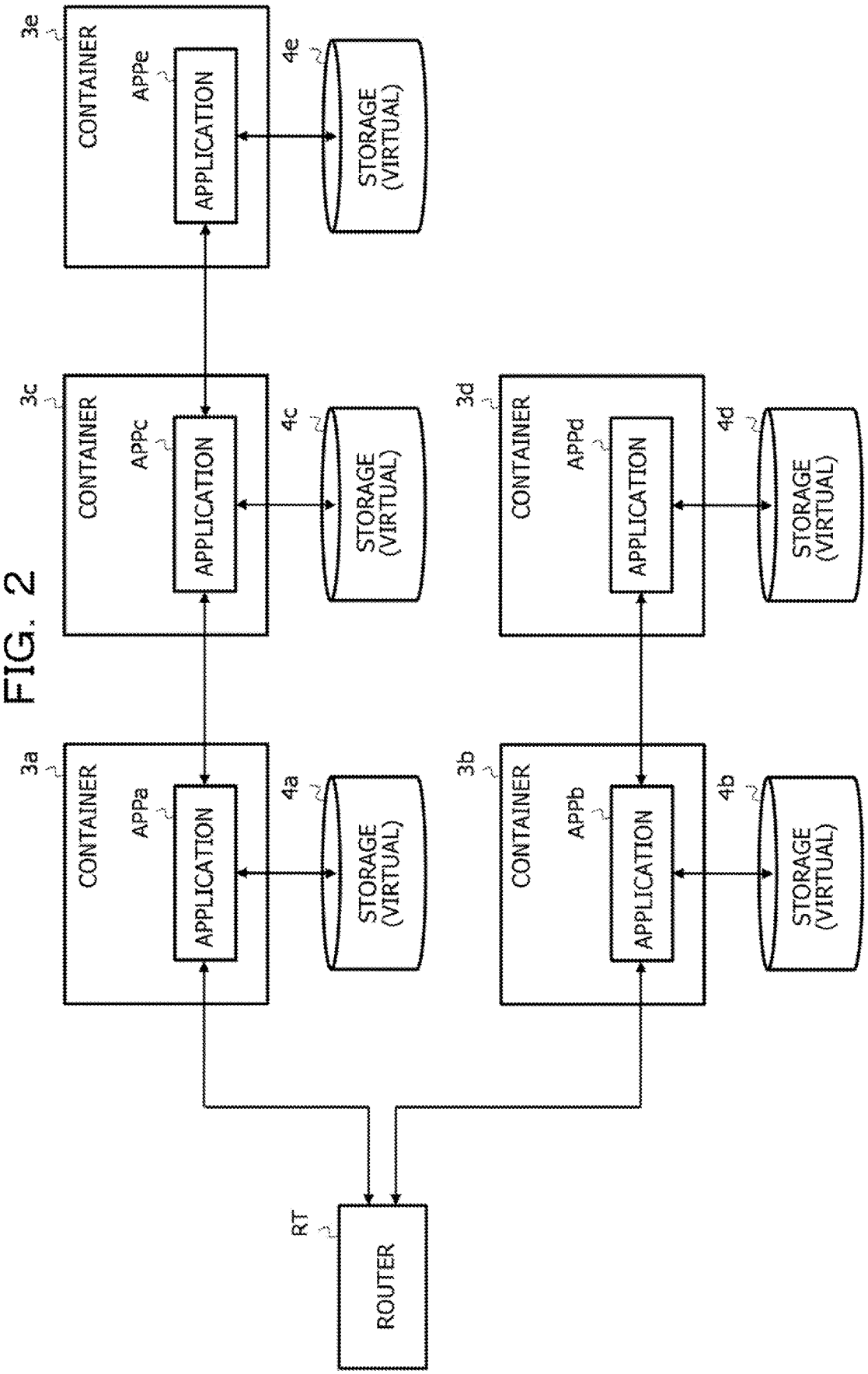
FIG. 2 illustrates a specific example of the configuration of containers.
Figure 3:
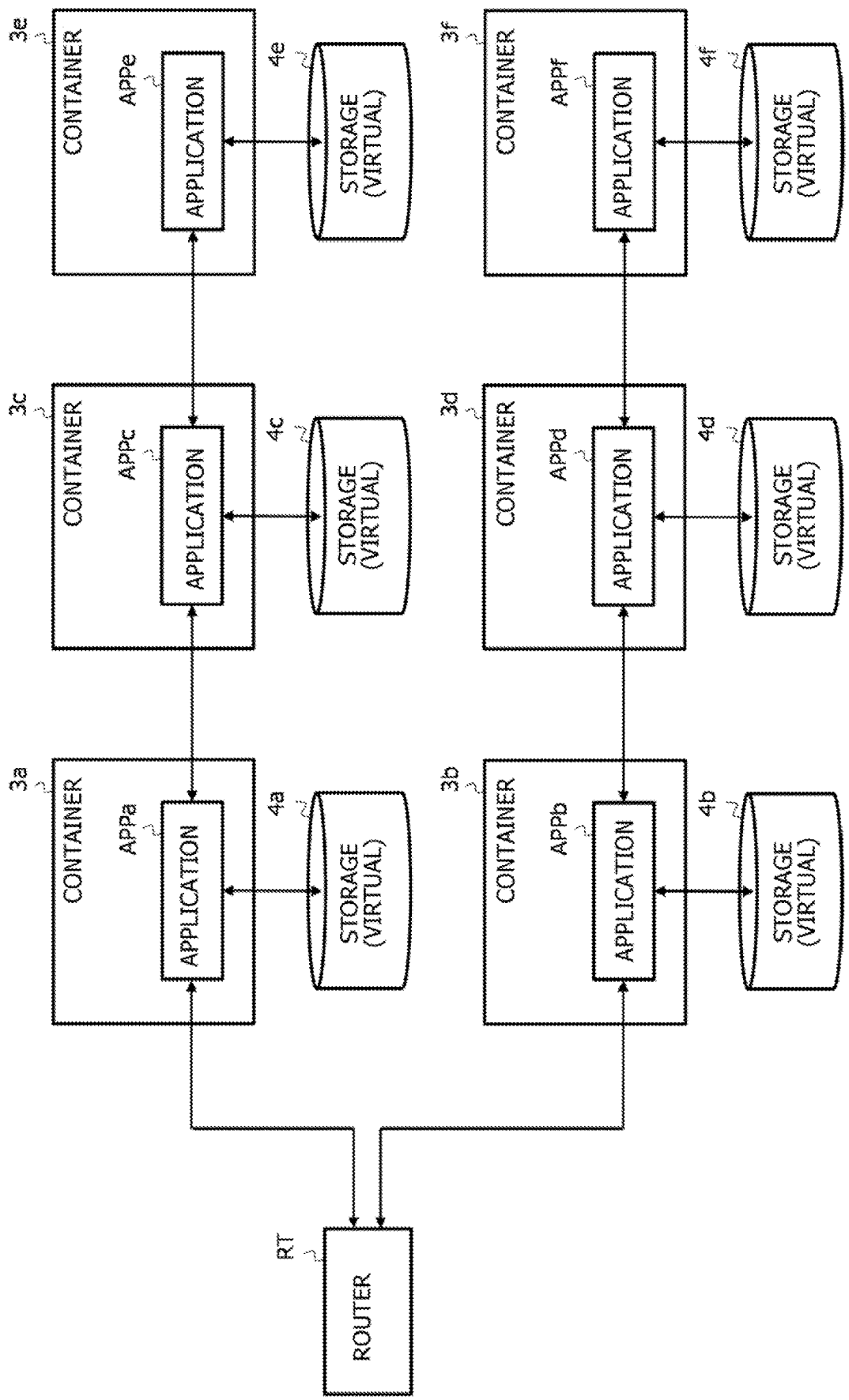
FIG. 3 illustrates a specific example of the configuration of the containers.
Figure 4:
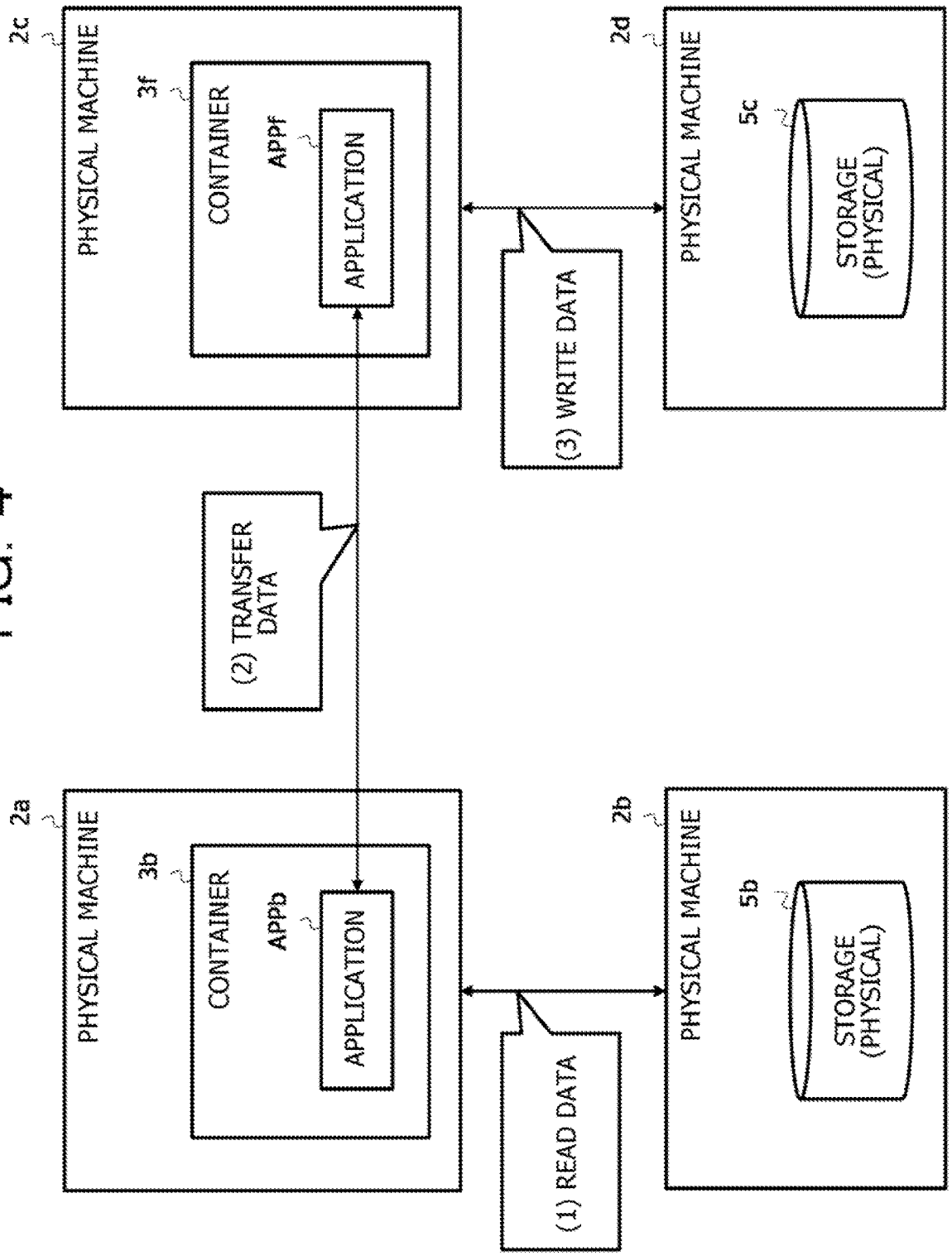
FIG. 4 illustrates a specific example of the configuration of the containers.

FIGS. 2 to 4 are each a diagram illustrating a specific example of the configuration of the containers 3. For example, FIGS. 2 to 4 are each a diagram illustrating a specific example when each application for implementing a distributed database runs in each container 3.

In the example illustrated in FIG. 2, the containers 3a, 3c, and 3e manage the same data set (hereinafter also referred to as a first data set) stored in each of the virtual storages 4a, 4c, and 4e, respectively. In other words, the container 3a functions as a primary container that manages the first data set, and each of the containers 3c and 3e functions as a secondary container that manages the first data set.

Moreover, the containers 3b and 3d manage the same data set (hereinafter also referred to as a second data set) stored in each of the virtual storages 4b and 4d, respectively. In other words, the container 3b functions as a primary container that manages the second data set, and the container 3d functions as a secondary container that manages the second data set.

Here, the containers 3 as described above generally do not have a mechanism for permanently holding data. Therefore, processing such as determining the storage location of the data accessed by each container 3 is performed in the virtual storage 4, for example. Thus, in the information processing system 10 using the containers 3 as described above, the physical machine 2 on which each container 3 is deployed may be different from the physical machine 2 on which the storage 5 accessed by each container 3 is mounted.

For example, in the example Illustrated in FIG. 1, the storage 5b accessed by the container 3b is mounted on the physical machine 2b that is the physical machine 2 different from the physical machine 2a on which the container 3b is run. Also, in the example illustrated in FIG. 1, for example, the storage 5c accessed by the container 3d is mounted on the physical machine 2d that is the physical machine 2 different from the physical machine 2c on which the container 3d is run.

Therefore, as illustrated in FIG. 3, for example, when a new container 3f is deployed (added) due to a change in the container configuration, a failure, or the like, and data synchronization is to be performed between the container 3b and the container 3f, an application APPb that runs in the container 3b has to read data accessed by the container 3b from the storage 5b before the data synchronization is performed between the container 3b and the container 3f as illustrated in FIG. 4, for example. Also, as illustrated in FIG. 4, for example, an application APPf that runs in the container 3f in this case has to re-transfer the data transferred from the container 3b to the storage 5c accessed by the container 3f after the data synchronization is performed between the container 3b and the container 3f.

As a result, for example, the information processing system 10 may not complete the data synchronization associated with the deployment of the container 3f within a desired time, and may take a long time to change the configuration of the containers 3 or recover from a failure.

In addition, the load associated with the execution of the processing of reading the data from the storage 5b and the processing of transferring the data to the container 3f may affect another processing performed in the container 3b. Therefore, it is preferable that the processing associated with the deployment of the container 3f such as the data synchronization is completed in the shortest possible time.

Moreover, when the deployment of the container 3f is performed due to the occurrence of a failure, it is preferable that the processing associated with the deployment of the container 3f is completed in the shortest possible time as well in terms of early recovery from the failure.

Thus, when a new one of the containers 3 (hereinafter also referred to as a first container 3) is to be deployed, the management device 1 of the present embodiment refers to a storage unit storing operation history information corresponding to the container 3 deployed on the physical machine 2, and identifies a reason why the new container 3 is to be deployed. Then, the management device 1 then determines the physical machine 2 on which the new container 3 is to be deployed in accordance with the reason identified.

In other words, when the new container 3 is to be deployed, the management device 1 of the present embodiment refers to the operation history information of each container 3 deployed on the physical machine 2, and determines whether or not the deployment of the new container 3 involves transfer of data to the new container 3 (synchronization of data between another one of the containers 3 and the new container 3). Then, when determining that the deployment of the new container 3 involves transfer of data to the new container 3, the management device 1 determines, for example, the physical machine 2 on which the storage 5 is mounted as the deployment location of the new container 3.

As a result, when the deployment of the new container 3 involves transfer of data to the new container 3, the management device 1 can avoid re-transferring of the data, which is transferred from the other container 3 to the new container 3, to the storage 5 mounted on the physical machine 2 different from that on which the new container 3 is deployed. Therefore, the management device 1 can thus finish the data synchronization processing associated with the deployment of the new container 3 in a short time.

[Hardware Configuration of Information Processing System]

Figure 5:
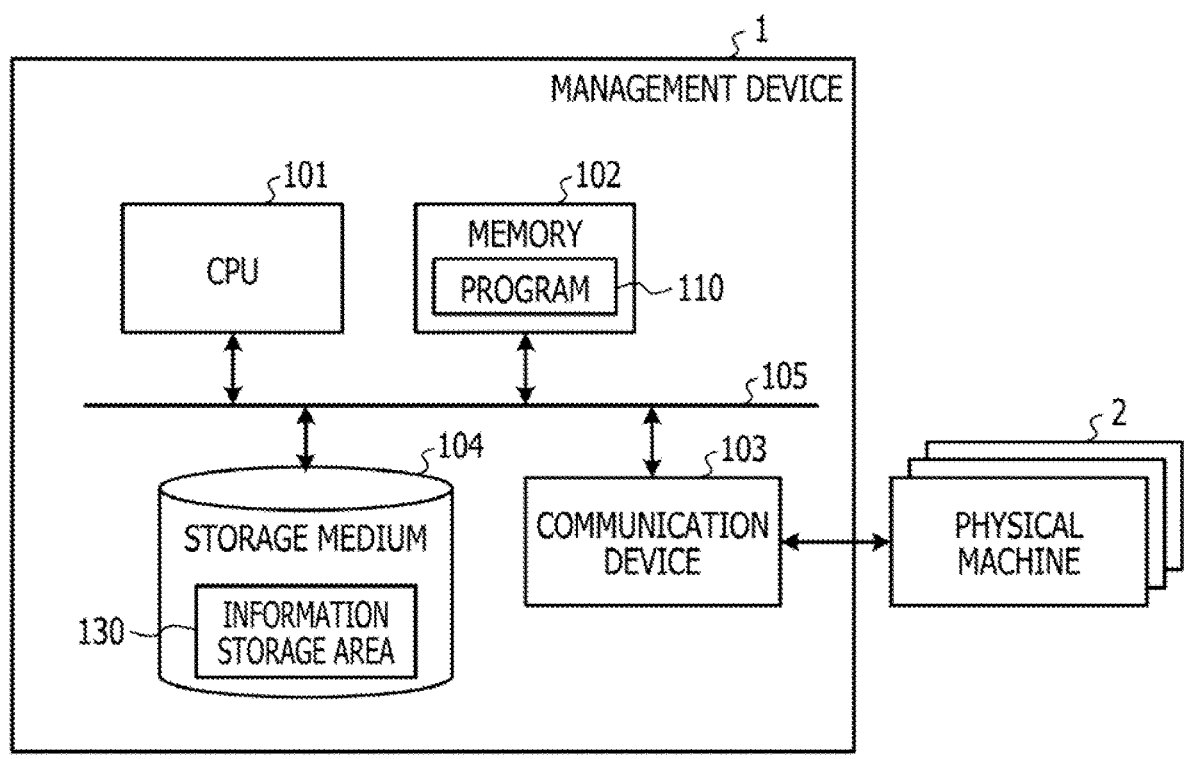
FIG. 5 illustrates a hardware configuration of a management device.

Next, a hardware configuration of the information processing system 10 will be described. FIG. 5 is a diagram illustrating a hardware configuration of the management device 1.

As illustrated in FIG. 5, the management device 1 includes a central processing unit (CPU) 101 as a processor, a memory 102, a communication device 103, and a storage medium 104. The units are connected to one another via a bus 105.

The storage medium 104 has a program storage area (not illustrated) that stores a program 110 for performing processing of determining the deployment location of the container 3 (hereinafter referred to as deployment location determining processing), for example. Moreover, the storage medium 104 also has an information storage area 130 that stores information used in performing the deployment location determining processing, for example. Note that the storage medium 104 may be, for example, a hard disk drive (HDD) or a solid state drive (SSD).

The CPU 101 performs the deployment location determining processing by executing the program 110 loaded from the storage medium 104 into the memory 102.

Moreover, the communication device 103 communicates with the physical machines 2 via a network (not illustrated), for example.

[Functions of Information Processing System]

Figure 6:
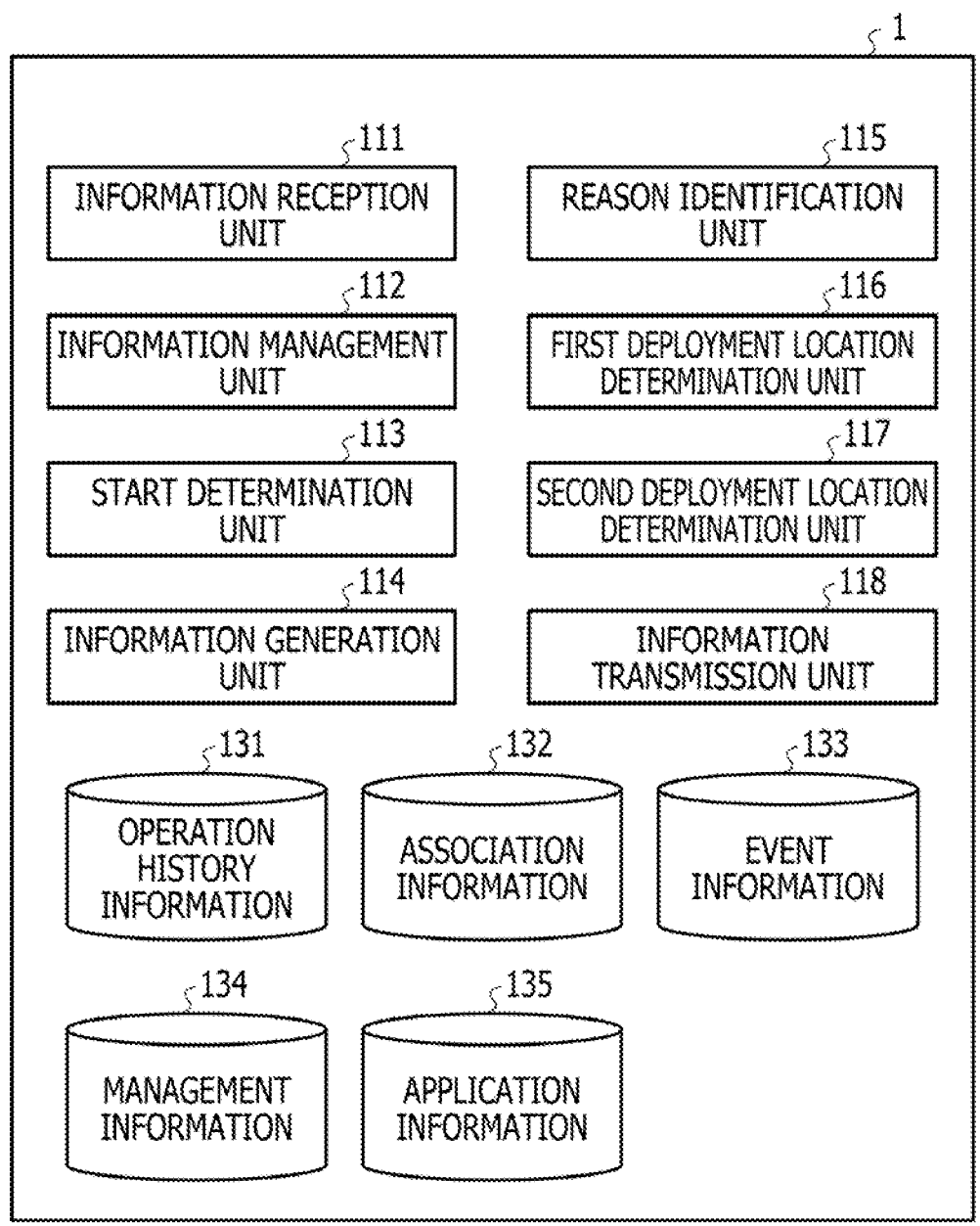
FIG. 6 is a functional block diagram of the management device.

Next, the functions of the information processing system 10 will be described. FIG. 6 is a functional block diagram of the management device 1.

As illustrated in FIG. 6, the management device 1 implements various functions including an information reception unit 111, an information management unit 112, a start determination unit 113, and an information generation unit 114 through organic collaboration between hardware such as the CPU 101 and the memory 102 and the program 110, for example. Moreover, through the organic collaboration between the hardware such as the CPU 101 and the memory 102 and the program 110, for example, the management device 1 further implements various functions including a reason identification unit 115, a first deployment location determination unit 116, a second deployment location determination unit 117 (hereinafter also simply referred to as a deployment location determination unit 117), and an information transmission unit 118.

Moreover, as illustrated in FIG. 6, for example, the management device 1 stores operation history information 131, association information 132, event information 133, management information 134, and application information 135 in the information storage area 130.

The information reception unit 111 acquires the operation history information 131 output from the container 3 that is run on the physical machine 2. The operation history information 131 is, for example, log information indicating a history of operations performed in each container 3.

Moreover, the information reception unit 111 also receives, for example, a deployment instruction for a new one of the containers 3 transmitted by an administrator of the information processing system 10 (hereinafter also simply referred to as an administrator) via an operation terminal (not illustrated).

The information management unit 112 stores the operation history information 131 received by the information reception unit 111 in the information storage area 130.

The start determination unit 113 detects the start of the container 3 (hereinafter also referred to as a second container 3) performed on the physical machine 2. Then, upon detecting the start of the container 3, the start determination unit 113 refers to the association information 132 stored in the information storage area 130 and determines whether or not the start of the container that has been started has also been performed in the past. The association information 132 is information in which information indicating the container 3 that has been started in the past on the physical machine 2 is associated with information indicating the storage 5 accessed by the container 3.

When it is determined that the container 3 whose start has been detected by the start determination unit 113 has not been started in the past, the information generation unit 114 generates Information in which information Indicating the container 3 whose start has been detected by the start determination unit 113 is associated with information indicating the storage 5 accessed by the container 3. Then, the information management unit 112 stores the information generated by the information generation unit 114 in the information storage area 130 as at least a part of the association information 132.

When the information reception unit 111 has received the deployment instruction for the container 3, the reason identification unit 115 refers to the operation history information 131 stored in the information storage area 130 and identifies a reason for deploying the container 3 for which the information reception unit 111 has received the deployment instruction.

When the reason identified by the reason identification unit 115 is not a predetermined reason, the first deployment location determination unit 116 for example randomly determines the physical machine 2 on which the container 3 is to be deployed, the container 3 corresponding to the deployment instruction received by the information reception unit 111. The predetermined reason is, for example, a reason indicating that data transfer to the container 3, for which the information reception unit 111 has received the deployment instruction, is involved.

When the reason identified by the reason identification unit 115 is the predetermined reason, the second deployment location determination unit 117 for example determines the physical machine 2, on which the storage 5 accessed by the container 3 corresponding to the deployment instruction received by the information reception unit 111 is mounted, as the physical machine 2 on which the container 3 corresponding to the deployment instruction received by the information reception unit 111 is to be deployed.

The information transmission unit 118 for example transmits, to the operation terminal (not illustrated) of the administrator, information indicating the physical machine 2 on which the container 3 determined by the first deployment location determination unit 116 or the second deployment location determination unit 117 (the container 3 corresponding to the deployment instruction received by the information reception unit 111) is to be deployed.

Note that the event information 133, the management information 134, and the application information 135 will be described later.

[Outline of First Embodiment]

Figure 7:
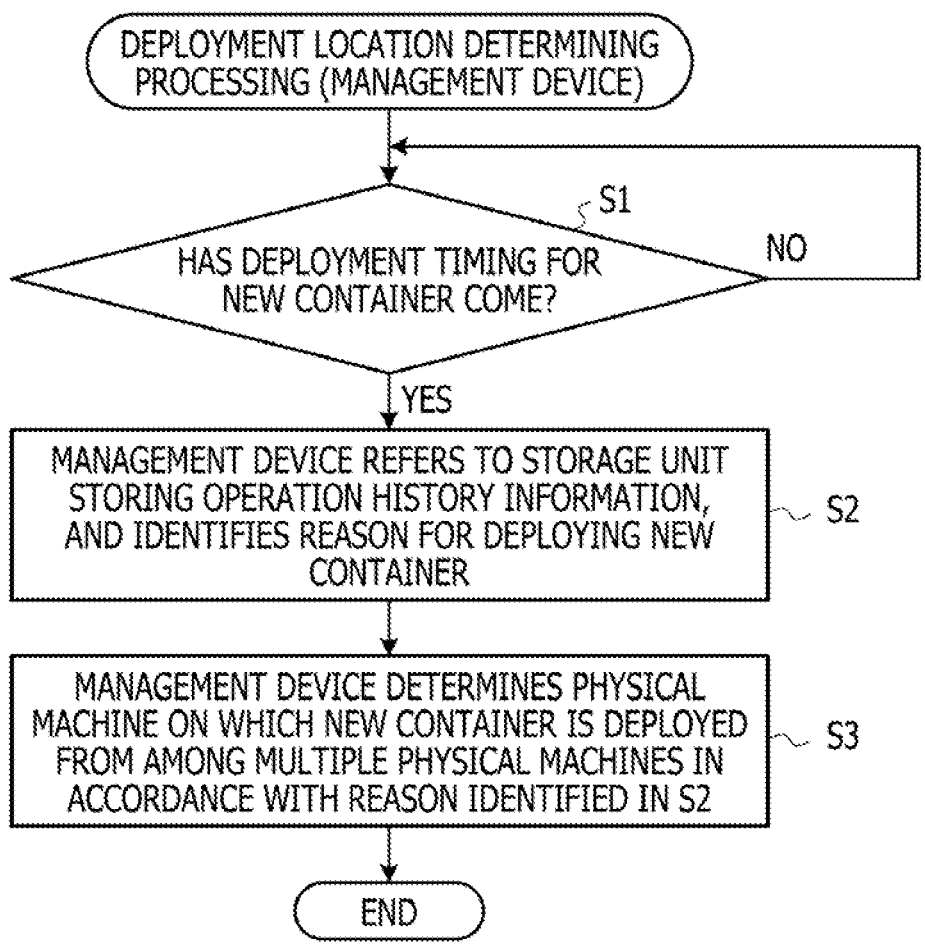
FIG. 7 is a flowchart illustrating an outline of deployment location determining processing according to a first embodiment.
Figure 8:
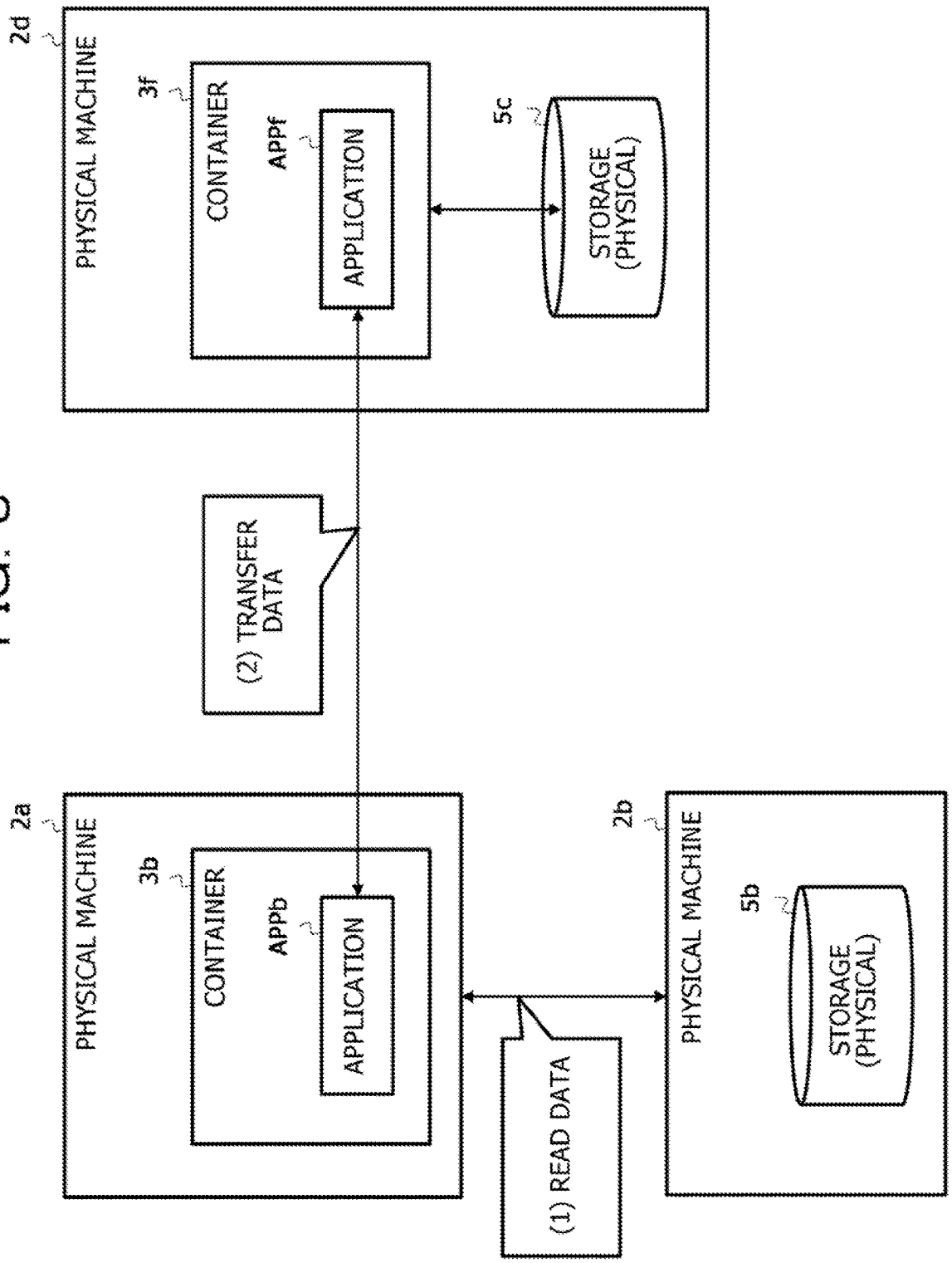
FIG. 8 illustrates the outline of the deployment location determining processing according to the first embodiment.

Next, an outline of the first embodiment will be described. FIG. 7 is a flowchart illustrating an outline of deployment location determining processing according to the first embodiment. FIG. 8 is a diagram illustrating the outline of the deployment location determining processing according to the first embodiment.

As illustrated in FIG. 7, the management device 1 waits until a deployment timing for a new one of the containers 3 (NO in S1). The deployment timing for the container may be, for example, the timing at which the management device 1 receives a deployment instruction for the container 3 from the operation terminal (not illustrated) of the administrator.

Then, when the deployment timing for the new container 3 has come (YES in S1), the management device 1 refers to the information storage area 130 storing the operation history information 131, and identifies a reason why the new container 3 is to be deployed (S2).

Then the management device 1 thereafter determines the physical machine 2 on which the new container 3 is to be deployed from among the plurality of the physical machines 2 in accordance with the reason identified in the processing of S2 (S3).

In other words, when the new container 3 is to be deployed, the management device 1 of the present embodiment refers to the operation history information 131 of each container 3 deployed on the physical machine 2, and determines whether or not the deployment of the new container 3 involves transfer of data to the new container 3 (synchronization of data between another one of the containers 3 and the new container 3). Then, when determining that the deployment of the new container 3 involves transfer of data to the new container 3, the management device 1 determines, for example, the physical machine 2 on which the storage 5 is mounted as the deployment location of the new container 3.

For example, as illustrated in FIG. 8, the management device 1 determines the physical machine 2d on which the storage 5c is mounted as the deployment location of the new container 3. Then, the management device 1 then stores the data transferred from the container 3b to the container 3f in the storage 5c mounted on the physical machine 2d on which the container 3f is deployed.

As a result, when the deployment of the new container 3 involves transfer of data to the new container 3, the management device 1 can avoid re-transferring of the data, which is transferred from the other container 3 to the new container 3, to the storage 5 mounted on the physical machine 2 different from that on which the new container 3 is deployed. Therefore, the management device 1 can thus finish the data synchronization processing associated with the deployment of the new container 3 in a short time.

[Details of First Embodiment]

Next, the details of the first embodiment will be described. FIGS. 9 to 12 are flowcharts illustrating the details of the deployment location determining processing according to the first embodiment. Moreover, FIGS. 13 to 22 are diagrams illustrating the details of the deployment location determining processing according to the first embodiment.

[Information Generation Processing]

Figure 9:
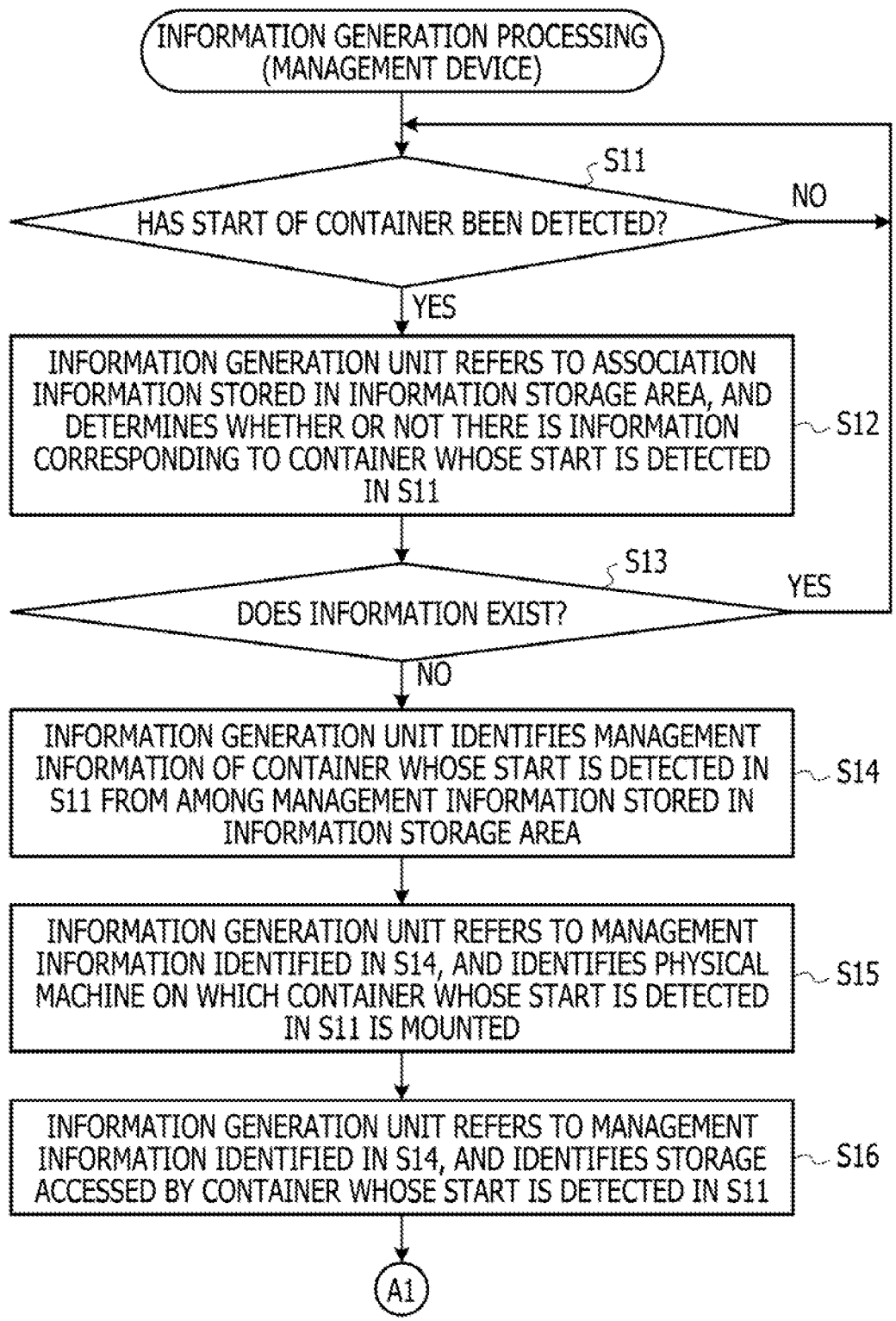
FIG. 9 is a flowchart illustrating details of the deployment location determining processing according to the first embodiment.
Figure 10:
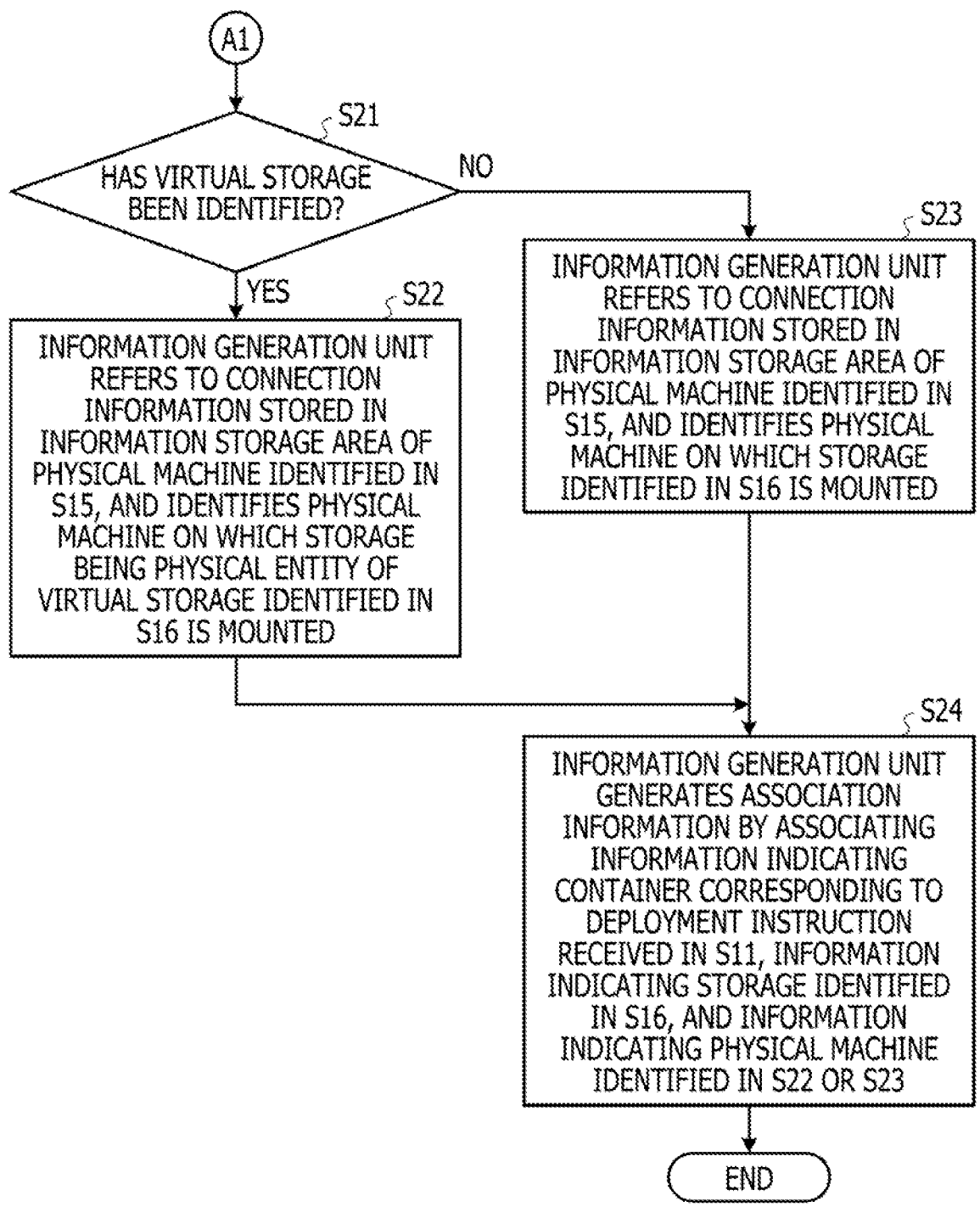
FIG. 10 is a flowchart Illustrating the details of the deployment location determining processing according to the first embodiment.

First, processing of generating the association information 132 (hereinafter also referred to as information generation processing) of the deployment location determining processing will be described. FIGS. 9 and 10 are flowcharts illustrating the information generation processing.

As illustrated in FIG. 9, the start determination unit 113 of the management device 1 waits until the start of the container 3 on the physical machine 2 is detected (NO in S11).

Then, when the start of the container 3 is detected (YES in S11), the information generation unit 114 of the management device 1 refers to the association information 132 stored in the information storage area 130 and determines whether or not there is information corresponding to the container 3 whose start Is detected in S11 (S12). Hereinafter, a specific example of the association information 132 will be described.

[Specific Example of Association Information]

FIGS. 13 and 16 are tables each illustrating a specific example of the association information 132.

The association information 132 illustrated in FIG. 13 and the like includes, as items, a "container" that specifies identification information of each container 3, a "storage (physical)" that specifies identification information of each storage 5, and a "server (storage)" that specifies the physical machine 2 on which each storage 5 is mounted.

For example, in a first row of the association information 132 illustrated in FIG. 13, "3a" indicating the container 3a is specified as the "container", "5a" indicating the storage 5a is specified as the "storage (physical)", and "2a" indicating the physical machine 2a is specified as the "server (storage)".

In other words, the first row of the association information 132 illustrated in FIG. 13 indicates that the storage 5a is the storage 5 accessed by the container 3a, and the physical machine 2a is the physical machine 2 on which the storage 5a is mounted.

Similarly, in a second row of the association information 132 illustrated in FIG. 13, "3c" indicating the container 3c is specified as the "container", "5b" indicating the storage 5b is specified as the "storage (physical)", and "2b" indicating the physical machine 2b is specified as the "server (storage)".

In other words, the second row of the association information 132 illustrated in FIG. 13 indicates that the storage 5b is the storage 5 accessed by the container 3c, and the physical machine 2b is the physical machine 2 on which the storage 5b is mounted. The description of other information included in FIG. 13 will be omitted.

Here, the association information 132 illustrated in FIG. 13 does not include information in which "3b" is specified as the "container". Therefore, for example, when the container 3b is the container 3 whose start is detected in the processing of S11, the information generation unit 114 determines that there is no information corresponding to the container 3 whose start is detected in the processing of S11.

Returning to FIG. 9, when it is determined that there is information corresponding to the container 3 whose start is detected in the processing of S11 (YES in S13), the management device 1 re-executes the processing from S11 onward.

On the other hand, when it is determined that there is no information corresponding to the container 3 whose start is detected in the processing of S11 (NO in S13), the management device 1 executes the processing from S14 onward.

In other words, when it Is determined that the association information 132 corresponding to the container 3 whose start is detected in the processing of S11 is absent, the management device 1 determines that the association information 132 for the container 3 whose start is detected in the processing of S11 has not been generated, and starts generating the association information 132 for the container 3 whose start is detected in the processing of S11.

Then, among the management information 134 stored in the information storage area 130, the information generation unit 114 identifies the management information 134 corresponding to the container 3 whose start Is detected in the processing of S11 (S14). Hereinafter, a specific example of the management information 134 will be described.

[Specific Example of Management Information]

FIG. 14 is a table illustrating a specific example of the management information 134. The management information 134 is information that manages a current operating status of each container 3. Also, the management information 134 is generated by the management device 1 (for example, the information generation unit 114) in response to the deployment of a new one of the containers 3, for example.

The management information 134 illustrated in FIG. 14 includes, as items, a "container" that specifies identification information of each container 3, a "server (container)" that specifies identification information of the physical machine 2 on which each container 3 is deployed, and a "storage" that specifies identification information of the storage accessed by each container 3 (the storage recognized by each container 3).

For example, in a first row of the management information 134 illustrated in FIG. 14, "3a" indicating the container 3a is specified as the "container", "2a" indicating the physical machine 2a is specified as the "server (container)", and "4a" indicating the virtual storage 4a is specified as the "storage".

In other words, the first row of the management information 134 illustrated in FIG. 14 indicates that the physical machine 2a is the physical machine 2 on which the container 3a is deployed, and the virtual storage 4a is the storage accessed by the container 3a (the storage recognized by the container 3a).

Similarly, in a second row of the management information 134 illustrated in FIG. 14, "3b" indicating the container 3b is specified as the "container", "2a" indicating the physical machine 2a is specified as the "server (container)", and "4b" indicating the virtual storage 4b is specified as the "storage".

In other words, the second row of the management information 134 illustrated in FIG. 14 indicates that the physical machine 2a is the physical machine 2 on which the container 3b is deployed, and the virtual storage 4b is the storage accessed by the container 3b (the storage recognized by the container 3b). The description of other information included in FIG. 14 will be omitted.

Therefore, for example, when the container 3b is the container 3 whose start is detected in the processing of S11, the information generation unit 114 identifies the information (the information in the second row) in which "3b" is specified as the "container" among the management information 134 illustrated in FIG. 14.

Returning to FIG. 9, the information generation unit 114 refers to the management information 134 identified in the processing of S14, and identifies the physical machine 2 on which the container 3 whose start is detected in the processing of S11 is mounted (S15).

For example, "2a" is specified as the "server (container)" in the information in the second row (the information in which "3b" is specified as the "container") of the management information 134 described with reference to FIG. 14. Accordingly, when the container 3b is the container 3 whose start is detected in the processing of S11, the Information generation unit 114 identifies the physical machine 2a as the physical machine 2 on which the container 3 whose start is detected in the processing of S11 is mounted.

Then, the information generation unit 114 further refers to the management information 134 identified in the processing of S14, and identifies the storage accessed by the container 3 whose start is detected in the processing of S11 (S16).

For example, "4b" is specified as the "storage" in the information in the second row (the information in which "3b" is specified as the "container") of the management information 134 described with reference to FIG. 14. Accordingly, when the container 3b is the container 3 whose start is detected in the processing of S11, the information generation unit 114 identifies the virtual storage 4b as the storage accessed by the container 3 whose start is detected in the processing of S11.

Subsequently, as illustrated in FIG. 10, the information generation unit 114 determines whether or not the virtual storage 4 is identified in the processing of S16 (S21).

When it is determined as a result that the virtual storage 4 is identified in the processing of S16 (YES in S21), the information generation unit 114 refers to the connection information 231 stored in the information storage area (not illustrated) of the physical machine 2 identified in the processing of S15, and identifies the physical machine 2 on which the storage 5 being the physical entity of the virtual storage 4 identified in the processing of S16 is mounted (S22). Hereinafter, a specific example of the connection information 231 stored in the physical machine 2 will be described.

[Specific Example of Connection Information]

FIG. 15 is a table illustrating a specific example of the connection information 231. FIG. 15 is the specific example of the connection information 231 stored in the Information storage area (not illustrated) of the physical machine 2a.

The connection information 231 is information indicating a connection status between the virtual storage 4 accessed by the container 3 deployed on each physical machine 2 and the storage 5 being the physical entity of the virtual storage 4. Also, the connection information 231 is generated by the physical machine 2 in response to the deployment of a new one of the containers 3, for example.

The connection information 231 illustrated in FIG. 15 includes, as items, a "storage (virtual)" that specifies identification information of the virtual storage 4 accessed by each container 3, a "storage (physical)" that specifies identification Information of the storage 5 being the physical entity of each virtual storage 4, and a "server (storage)" that specifies identification information of the physical machine 2 on which each storage 5 is mounted.

For example, in a first row of the connection information 231 illustrated in FIG. 15, "4a" indicating the virtual storage 4a is specified as the "storage (virtual)", "5a" indicating the storage 5a is specified as the "storage (physical)", and "2a" indicating the physical machine 2a is specified as the "server (storage)".

In other words, the first row of the connection information 231 illustrated in FIG. 15 indicates that the storage 5a is the physical entity of the virtual storage 4a, and the physical machine 2a is the physical machine 2 on which the storage 5a is mounted.

Similarly, in a second row of the connection information 231 illustrated in FIG. 15, "4b" indicating the virtual storage 4b is specified as the "storage (virtual)", "5b" indicating the storage 5b is specified as the "storage (physical)", and "2b" indicating the physical machine 2b is specified as the "server (storage)".

In other words, the second row of the connection information 231 illustrated in FIG. 15 indicates that the storage 5b is the physical entity of the virtual storage 4b, and the physical machine 2b is the physical machine 2 on which the storage 5b is mounted.

Therefore, for example, when the physical machine 2a is identified in the processing of S15 and the virtual storage 4b is identified in the processing of S16, in the processing of S22, the information generation unit 114 refers to the information in the second row of the connection information 231 described with reference to FIG. 15, and identifies the physical machine 2b as the physical machine 2 on which the storage 5b being the physical entity of the virtual storage 4b identified in the processing of S16 is mounted.

Returning to FIG. 10, when the virtual storage 4 is not identified in the processing of S16, that is, when the storage 5 is identified in the processing of S16 (NO in S21), the information generation unit 114 refers to the connection information 231 stored in the information storage area (not illustrated) of the physical machine 2 identified in the processing of S15, and identifies the physical machine 2 on which the storage 5 identified in the processing of S16 is mounted (S23).

Then, the information generation unit 114 generates the association information 132 by associating the information indicating the container 3 corresponding to the deployment instruction received in the processing of S11, the information indicating the storage 5 identified in the processing of S16, and the information indicating the physical machine 2 identified in the processing of S22 or S23 (S24). Then, the information management unit 112 thereafter stores, for example, the association information 132 generated in the processing of S24 in the information storage area 130.

For example, when the container 3b is the container 3 for which the deployment instruction is received in the processing of S11, the storage 5b is the storage 5 identified in the processing of S16, and the physical machine 2b is the physical machine 2 identified in the processing of S22, the Information generation unit 114 newly generates the association information 132 in which "3b" is specified as the "container", "5b" is specified as the "storage (physical)", and "2b" is specified as the "server (storage)" as indicated by underlined parts in FIG. 16, for example.

As a result, the information processing device 1 can generate the information regarding the storage 5 that is actually accessed by each container 3 deployed on the physical machine 2 (that is, the association information 132).

[Main Processing of Deployment Location Determining Processing]

Figure 11:
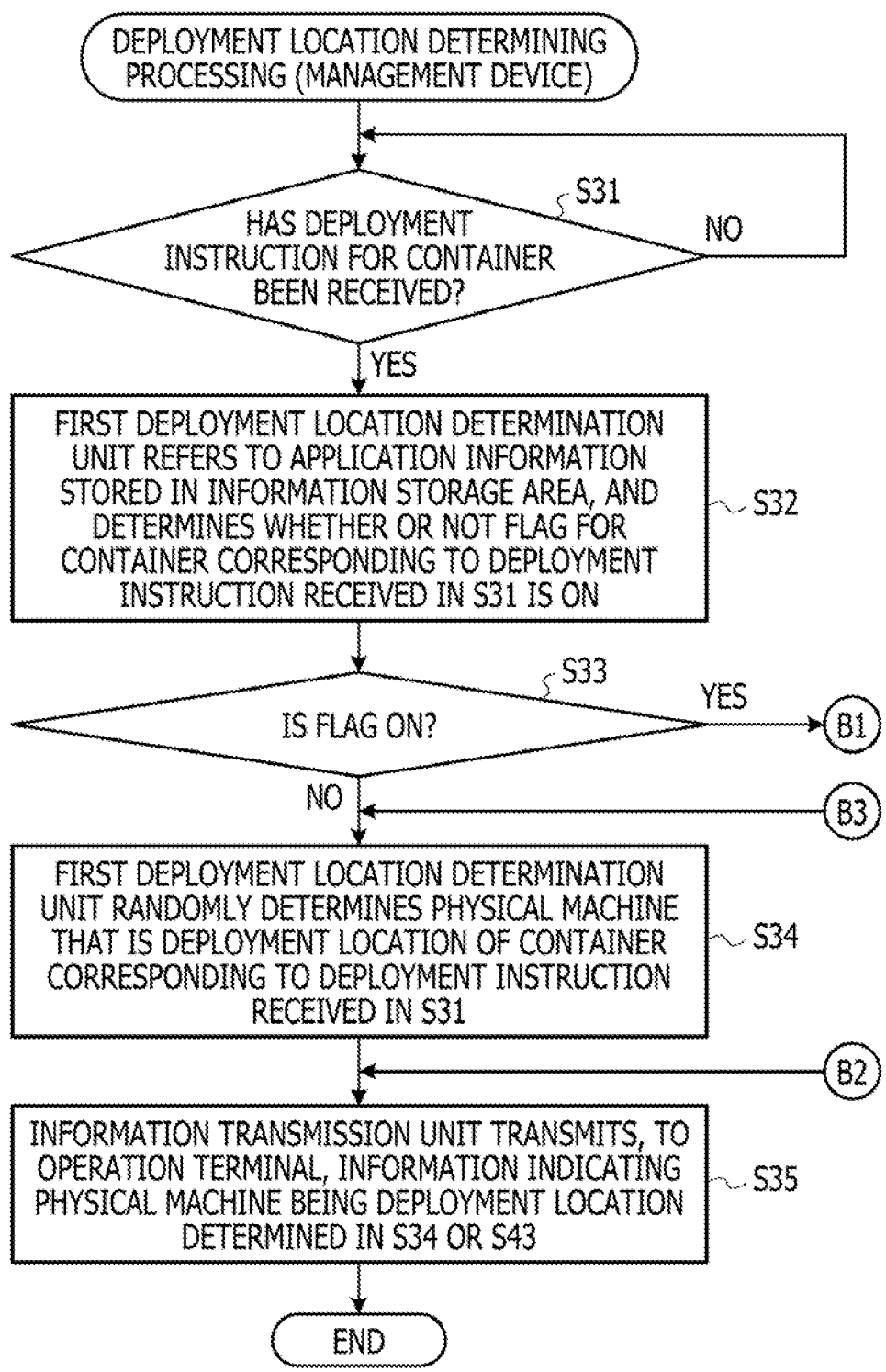
FIG. 11 is a flowchart illustrating the details of the deployment location determining processing according to the first embodiment.
Figure 12:
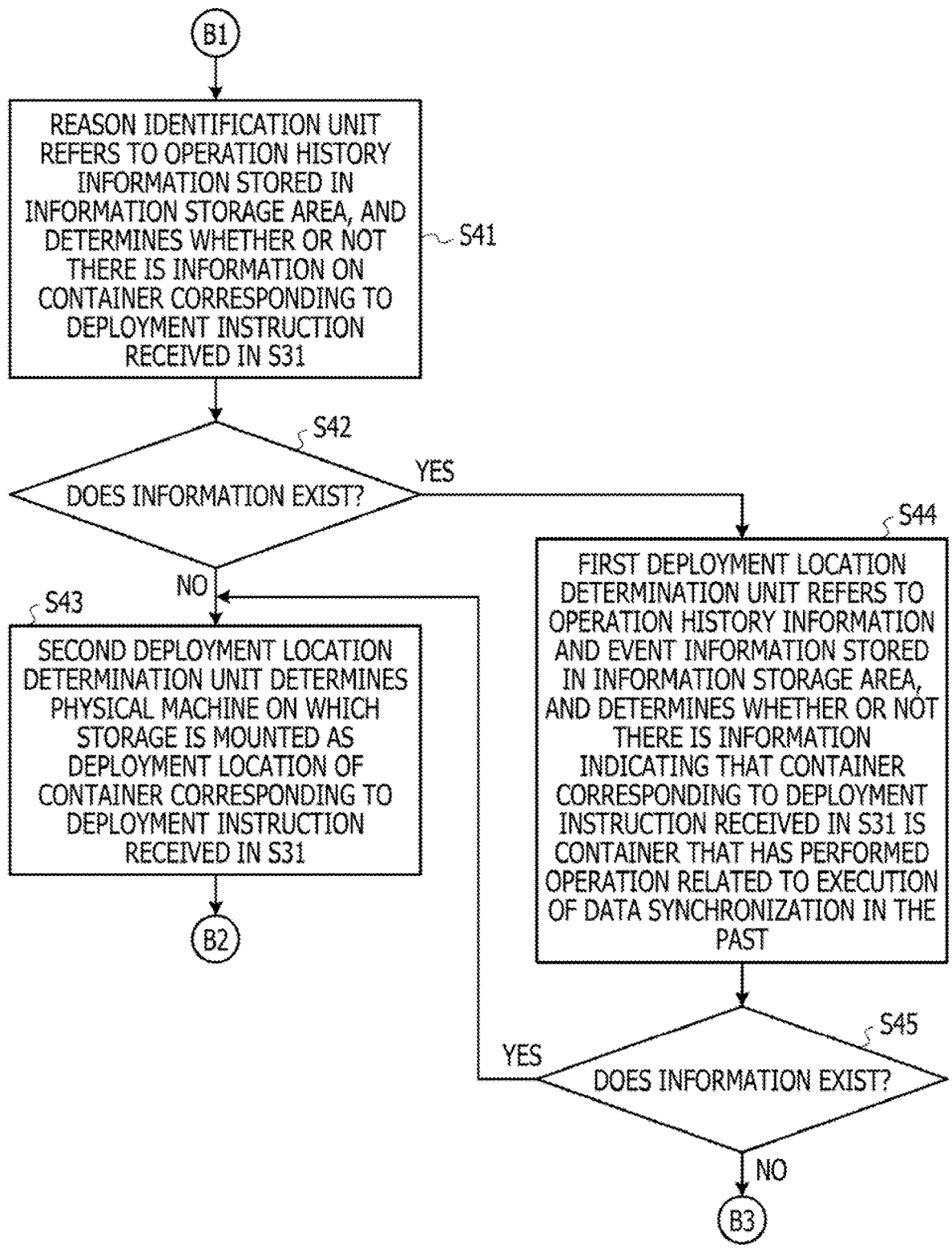
FIG. 12 is a flowchart illustrating the details of the deployment location determining processing according to the first embodiment.

Next, main processing of the deployment location determining processing will be described. FIGS. 11 and 12 are flowcharts illustrating the main processing of the deployment location determining processing.

As illustrated in FIG. 11, for example, the information reception unit 111 of the management device 1 waits until a deployment instruction for a new one of the containers 3 is received from an operation terminal (not illustrated) (NO in S31).

Then, when the deployment Instruction for the new container 3 is received (YES in S31), the first deployment location determination unit 116 of the management device 1 refers to the application information 135 stored in the information storage area 130 and determines whether or not a flag for the container 3 corresponding to the deployment instruction received in the processing of S31 is "ON" (S32). Hereinafter, a specific example of the application information 135 will be described.

[Specific Example of Application Information]

FIG. 17 is a table illustrating a specific example of the application information 135. The application information 135 is information indicating whether or not the deployment of the new container 3 for which the deployment instruction is received in the processing of S31 is determined by the processing by the second deployment location determination unit 117. In other words, the application information 135 is information indicating whether or not initialization processing (initialization processing that involves processing of data) is needed to be performed in a short time for the service provided by the new container 3 for which the deployment instruction is received in the processing of S31. Note that the application information 135 is generated in advance by an administrator, for example.

The application information 135 illustrated in FIG. 17 includes, as items, a "service" that specifies identification information of the type of service provided to a user by each container 3, and a "flag" that indicates whether or not the initialization processing of the service provided by each container 3 is needed to be performed in a short time. The "flag" specifies "ON" indicating that the initialization processing of the service provided by each container 3 is needed to be performed in a short time, or "OFF" indicating that the initialization processing of the service provided by each container 3 does not have to be performed in a short time.

For example, in a first row of the application information 135 illustrated in FIG. 17, "AAA" is specified as the "service", and "ON" is specified as the "flag".

In other words, the information in the first row of the application information 135 illustrated in FIG. 17 indicates that the flag is turned "ON" when "AAA" is the type of service provided by the container 3 corresponding to the deployment instruction received in the processing of S31.

Similarly, in a second row of the application information 135 illustrated in FIG. 17, "BBB" is specified as the "service", and "ON" is specified as the "flag".

In other words, the information in the second row of the application information 135 illustrated in FIG. 17 indicates that the flag is turned "ON" when "BBB" is the type of service provided by the container 3 corresponding to the deployment instruction received in the processing of S31. The description of other information included in FIG. 17 will be omitted.

As a result, for example, the management device 1 uses the second deployment location determination unit 117 to be able to process only the container 3 that provides a service for which the initialization processing of the service provided by each container 3 (initialization processing that involves processing of data) is desirably performed in a short time.

Returning to FIG. 11, when it is determined that the flag for the new container 3 corresponding to the deployment instruction received in the processing of S31 is "OFF" (NO in S33), the first deployment location determination unit 116 for example randomly determines the physical machine 2 on which the new container 3 corresponding to the deployment instruction received in the processing of S31 is to be deployed (S34).

On the other hand, when it is determined that the flag for the new container 3 corresponding to the deployment instruction received in the processing of S31 is "ON" (YES in S33), as illustrated in FIG. 12, the reason identification unit 115 of the management device 1 refers to the operation history information 131 stored in the information storage area 130 and determines whether or not there is information on the new container 3 corresponding to the deployment instruction received in the processing of S31 (S41).

When it is determined as a result that there is information on the new container 3 corresponding to the deployment instruction received in the processing of S31 (YES in S42), the first deployment location determination unit 116 refers to the operation history Information 131 and the event information 133 stored in the Information storage area 130, and determines whether or not there is information indicating that the new container 3 corresponding to the deployment instruction received in the processing of S31 is the container 3 that has performed an operation related to the execution of data synchronization in the past (S44).

For example, in this case, the first deployment location determination unit 116 determines whether or not there is information indicating that the new container 3 corresponding to the deployment instruction received in the processing of S31 is the container 3 that has terminated abnormally (for example, terminated abnormally due to data corruption) in the past. Hereinafter, specific examples of the operation history information 131 and the event Information 133 will be described.

[Specific Example of Event Information]

First, a specific example of the event information 133 will be described. FIG. 18 is a table illustrating the specific example of the event information 133. The event information 133 is, for example, information indicating an event that is output when each container 3 terminates abnormally.

For example, a first row of the event information 133 illustrated in FIG. 18 specifies "No such file or directory" and "WT_PANIC" as a "first character string" and a "second character string", respectively.

In other words, the information in the first row of the event information 133 illustrated in FIG. 18 indicates that the container 3 corresponding to the operation history information 131 including the character string of "No such file or directory" and the character string of "WT_PANIC" is the container 3 that has terminated abnormally due to data corruption.

Similarly, for example, a second row of the event information 133 illustrated in FIG. 18 specifies "No such file or directory" and "BACKTRACE" as the "first character string" and the "second character string", respectively.

In other words, the information in the second row of the event information 133 illustrated in FIG. 18 indicates that the container 3 corresponding to the operation history information 131 including the character string of "No such file or directory" and the character string of "BACKTRACE" is the container 3 that has terminated abnormally due to data corruption.

[Specific Example of Operation History Information]

Figure 19:
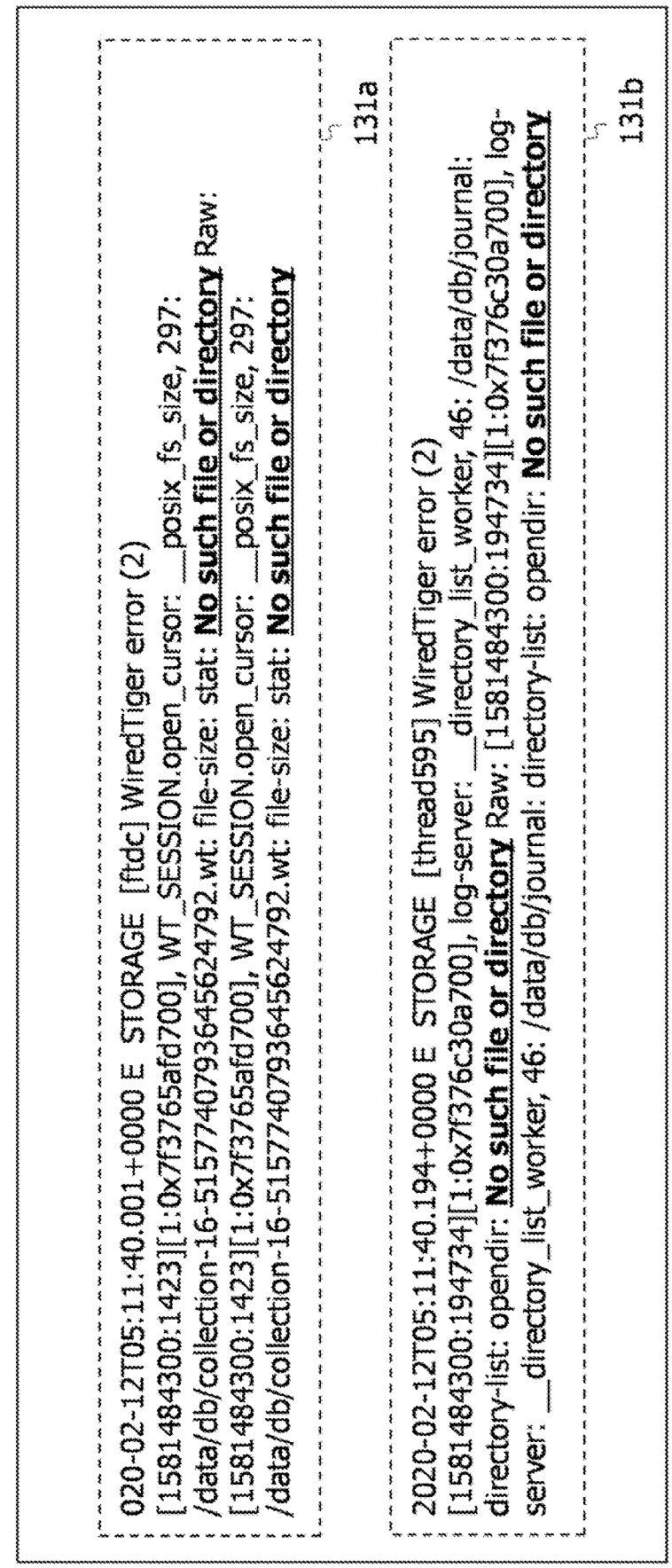
FIG. 19 illustrates a specific example of operation history information.

Next, specific examples of the operation history information 131 will be described. FIGS. 19 and 20 are diagrams Illustrating the specific examples of the operation history information 131.

For example, as indicated by underlined parts of FIG. 19, a log 131a and a log 131b each include "No such file or directory".

Moreover, as Indicated by underlined parts of FIG. 20, a log 131c includes "WT_PANIC", and a log 131d includes "BACKTRACE".

Therefore, for example, when the operation history information 131 illustrated in FIGS. 19 and 20 is included in the operation history information 131 of the new container 3 corresponding to the deployment instruction received in the processing of S31, in the processing of S44, the first deployment location determination unit 116 determines that there exists the operation history information 131 indicating that the new container 3 corresponding to the deployment instruction received in the processing of S31 is the container 3 that has terminated abnormally in the past.

Returning to FIG. 12, when it is determined that there exists the information indicating that the new container 3 corresponding to the deployment instruction received in the processing of S31 is the container 3 that has performed the operation related to the execution of data synchronization in the past (YES in S45), the second deployment location determination unit 117 of the management device 1 determines the physical machine 2 on which the storage 5 is mounted as the deployment location of the new container 3 corresponding to the deployment instruction received in the processing of S31 (S43). Moreover, the second deployment location determination unit 117 also performs the processing of S43 in a similar manner when it is determined that there is no information on the new container 3 corresponding to the deployment instruction received in the processing of S31 (NO in S42).

In other words, when it is determined that the new container 3 corresponding to the deployment instruction received in the processing of S31 is the container 3 that has performed the operation related to the execution of data synchronization on the physical machine 2 in the past (YES in S45), the management device 1 determines, for example, that the deployment of the container 3 corresponding to the deployment instruction received in the processing of S31 is performed in response to the occurrence of a failure or the like. Thus, in this case, the management device 1 determines that data synchronization is to occur between the new container 3 and another one of the containers 3 after the deployment of the new container 3 corresponding to the deployment instruction received in the processing of S31 is completed. Therefore, in this case, the management device 1 determines the physical machine 2 on which the storage 5 is mounted as the deployment location of the container 3 corresponding to the deployment instruction received in the processing of S31.

Moreover, when it is determined that there is no information on the container 3 corresponding to the deployment instruction received in the processing of S31 (NO in S42), the management device 1 determines, for example, that the deployment of the container 3 corresponding to the deployment instruction received in the processing of S31 is an addition of the container 3 due to a change in the configuration of the containers 3 or the like. Thus, in this case, the management device 1 determines that data synchronization is to occur between the new container 3 and another one of the containers 3 after the deployment of the new container 3 corresponding to the deployment instruction received in the processing of S31 is completed. Therefore, in this case, the management device 1 determines the physical machine 2 on which the storage 5 is mounted as the deployment location of the container 3 corresponding to the deployment instruction received in the processing of S31.

As a result, for example, the management device 1 can avoid re-transferring of the data, which is transferred from the other container 3 to the new container 3, to the storage 5 mounted on the physical machine 2 different from that on which the new container 3 is deployed. Thus, the management device 1 can reduce the data synchronization time associated with the deployment of the new container 3.

On the other hand, the processing from S34 onward is performed when it is determined that there is no information indicating that the container 3 corresponding to the deployment instruction received in the processing of S31 is the container 3 that has performed the operation related to the execution of data synchronization in the past (NO in S45).

Then, the Information transmission unit 118 of the management device 1 transmits information indicating the physical machine 2, which is the deployment location determined in the processing of S34 or S43, to the operation terminal (not illustrated).

Note that the management device 1 may start the deployment of the container 3 corresponding to the deployment instruction received in the processing of S31 in response to the determination of the physical machine 2 as the deployment location in the processing of S34 or S43.

As described above, when a new one of the containers 3 is to be deployed, the management device 1 of the present embodiment refers to the information storage area 130 storing the operation history information 131 corresponding to the containers 3 deployed on the plurality of physical machines 2, and identifies a reason why the new container 3 is to be deployed. Then, the management device 1 then determines the physical machine 2 on which the new container 3 is to be deployed in accordance with the reason identified.

In other words, when the new container 3 is to be deployed, the management device 1 of the present embodiment refers to the operation history information 131 of each container 3 deployed on the physical machine 2, and determines whether or not the deployment of the new container 3 involves transfer of data to the new container 3 (synchronization of data between another one of the containers 3 and the new container 3). Then, when determining that the deployment of the new container 3 involves transfer of data to the new container 3, the management device 1 determines, for example, the physical machine 2 on which the storage 5 is mounted as the deployment location of the new container 3.

As a result, when the deployment of the new container 3 involves transfer of data to the new container 3, the management device 1 can avoid re-transferring of the data, which is transferred from the other container 3 to the new container 3, to the storage 5 mounted on the physical machine 2 different from that on which the new container 3 is deployed. Therefore, the management device 1 can thus finish the data synchronization processing associated with the deployment of the new container 3 in a short time. Moreover, the management device 1 can avoid complication of the correspondence between each container 3 and the storage 5 as compared with a case where the containers 3 themselves use the plurality of storages 5 properly to avoid re-transferring of the data.

Figure 21:
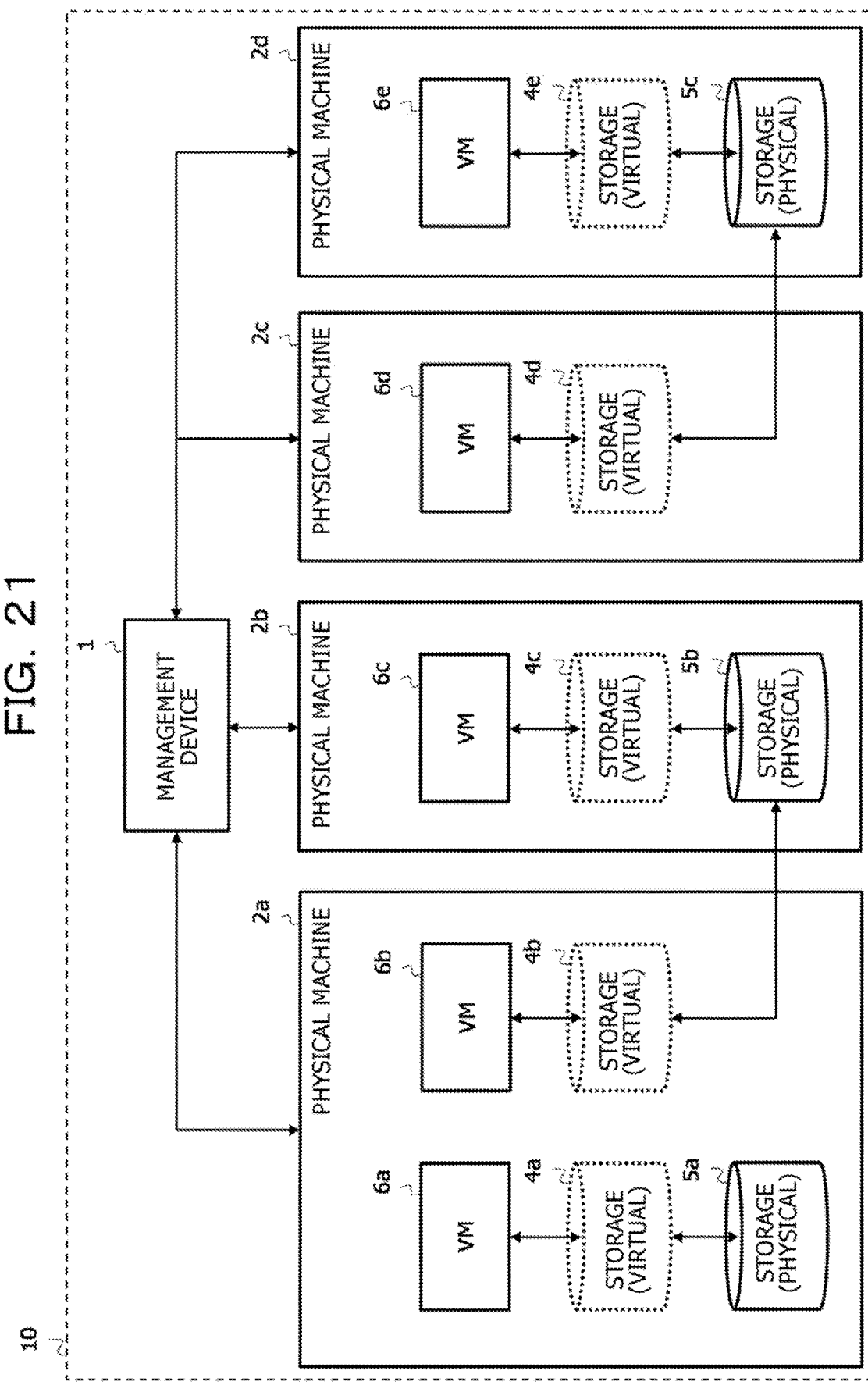
FIG. 21 illustrates the details of the deployment location determining processing according to the first embodiment.
Figure 22:
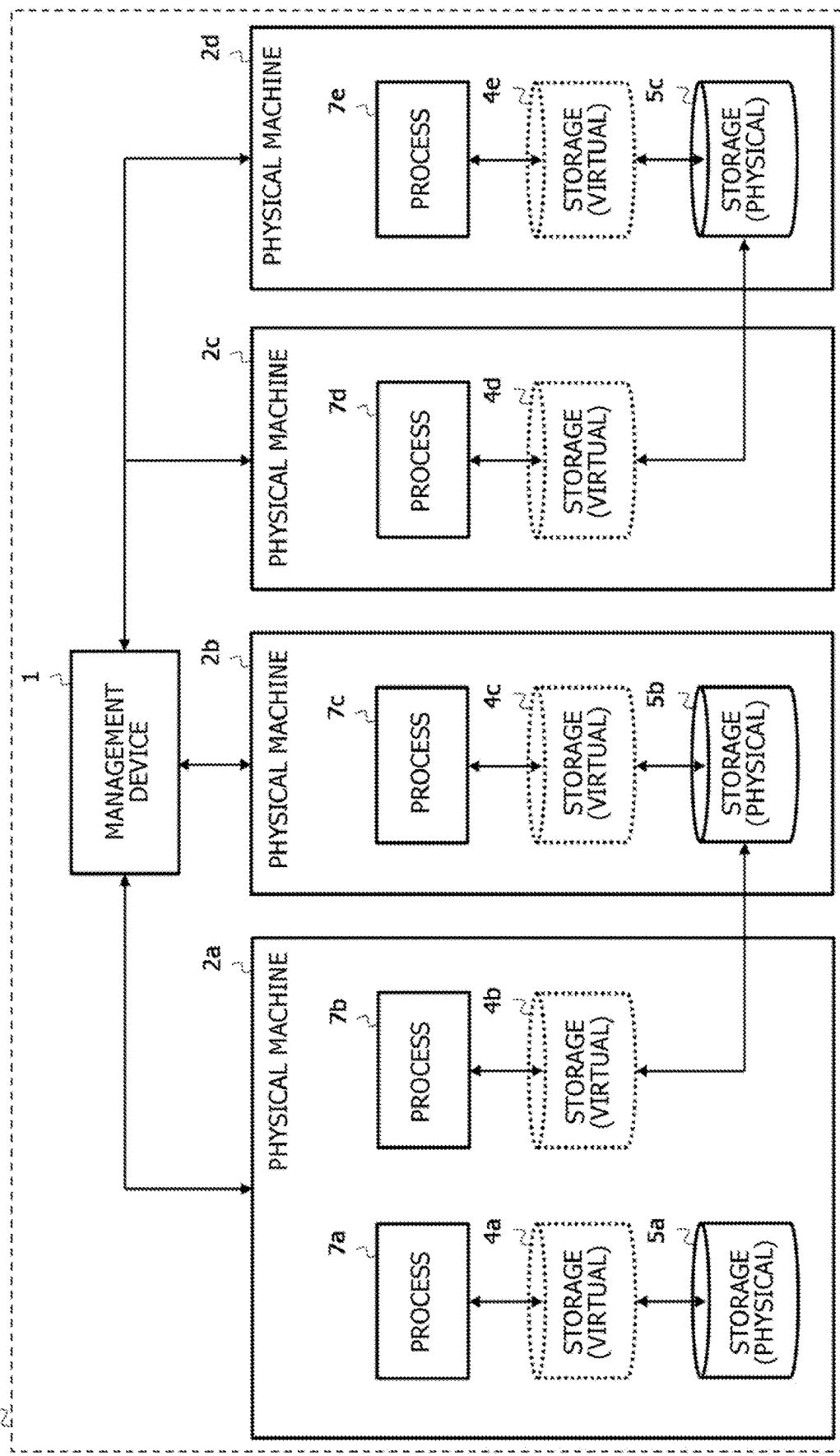
FIG. 22 illustrates the details of the deployment location determining processing according to the first embodiment.

Note that although the above example has described the case where the deployment of the container 3 is determined, the deployment location determining processing of the present embodiment may be used in determining the deployment of virtual machines (VMs 6a, 6b, 6c, 6d, and 6e) and the deployment of processes (processes 7a, 7b, 7c, 7d, and 7e) as illustrated in FIGS. 21 and 22.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present Invention have been described in detail, it should be understood that the various changes, substitutions, and alterations could be made hereto without departing from the spirit and scope of the invention.

What is claimed is:

1. An information processing device of deploying containers on a plurality of physical machines, the device comprising:
   memory configured to store operation history information, the operation history information corresponding to each of the containers deployed on the plurality of physical machines, each of the plurality of physical machines being a physical machine on which at least any of a virtual storage or a physical storage; and
   processor circuitry coupled to the memory, the processor circuitry being configured to perform processing, the processing including:
   in response to an indication to deploy a first container, identifying from the operation history information a reason why the first container is to be deployed; and
   determining a first physical machine from among the plurality of physical machines by using the reason identified to use the determined physical machine as a target physical machine on which the first container is to be deployed,
   the determining of the first physical machine includes
   in response to the identified reason being a reason that indicates the deploying of the first container is accompanied by a data synchronization to the first container from a second container different from the first container, determining, as the target physical machine, the first physical machine being a physical machine on which the physical storage is mounted, to use the physical storage mounted on the first physical machine to store transferred data from the second container.

2. The information processing device according to claim 1, wherein the determining of the physical machine is configured to, in response to the identified reason being a reason that indicates that data is transferred to the first container, determine the physical machine on which a storage is mounted among the plurality of physical machines as the physical machine on which the first container is to be deployed.

3. The information processing device according to claim 2, wherein the identifying of the reason is configured to
   determine whether the operation history information that corresponds to the first container is stored in the memory, and
   in response to that the operation history information corresponding to the first container is determined not to be stored, determine that the reason indicates that data is transferred to the first container, and
   the determining of the physical machine is configured to determine the physical machine on which the storage is mounted as the physical machine on which the first container is to be deployed.

4. The information processing device according to claim 3, wherein the storage is a storage configured to be accessed by the first container.

5. The information processing device according to claim 3, wherein the identifying of the reason is configured to in response that the operation history information corresponding to the first container is determined to be stored, determine whether the operation history information is first operation history information indicating that the first container is a container that has performed an operation related to execution of data synchronization in the past on the plurality of physical machines, and in response that the operation history information corresponding to the first container is the first operation history information, determine that the reason indicates that data is transferred to the first container, and the determining of the physical machine is configured to determine the physical machine on which the storage is mounted as the physical machine on which the first container is to be deployed.

6. The information processing device according to claim 5, wherein the first operation history information indicates that the first container is a container that has terminated abnormally in the past on the plurality of physical machines.

7. The information processing device according to claim 2, the processing further comprising:

in response that a second container is started on the plurality of physical machines, determining whether the second container has been started in the past; and in response determining that the second container has not been started in the past,
generating association information between the physical machine on which the second container is deployed and the physical machine on which a storage accessed by the second container is mounted, wherein the determining of the physical machine is configured to determine, by using the generated association information, the physical machine on which the storage is mounted as the physical machine on which the first container is to be deployed.

8. The information processing device according to claim 7, wherein the determining of whether the second container has been started in the past is configured to determine whether the association information corresponding to the second container is stored in the memory, and determine that the second container has been started in the past in response to determining that the association information corresponding to the second container is stored in the memory.

9. A non-transitory computer-readable storage medium for storing a deployment location determining program which causes a processor to perform processing of deploying containers on a plurality of physical machines, each of the plurality of physical machines being a physical machine on which at least any of a virtual storage or a physical storage, the processing comprising:

in response to an indication to deploy a first container, identifying from the operation history information a reason why the first container is to be deployed; and determining a first physical machine from among the plurality of physical machines by using the reason identified to use the determined physical machine as a target physical machine on which the first container is to be deployed, the determining of the first physical machine includes in response to the identified reason being a reason that indicates the deploying of the first container is accompanied by a data synchronization to the first container from a second container different from the first container, determining, as the target physical machine, the first physical machine being a physical machine on which the physical storage is mounted, to use the physical storage mounted on the first physical machine to store transferred data from the second container.

10. The non-transitory computer-readable storage medium according to claim 9, wherein the determining of the physical machine is configured to, in response to the identified reason being a reason that indicates that data is transferred to the first container, determine the physical machine on which a storage is mounted among the plurality of physical machines as the physical machine on which the first container is to be deployed.

11. The non-transitory computer-readable storage medium according to claim 10, wherein the identifying of the reason is configured to determine whether the operation history information that corresponds to the first container is stored in the memory, and in response to that the operation history information corresponding to the first container is determined not to be stored, determine that the reason indicates that data is transferred to the first container, and the determining of the physical machine is configured to determine the physical machine on which the storage is mounted as the physical machine on which the first container is to be deployed.

12. The non-transitory computer-readable storage medium according to claim 11, wherein the storage is a storage configured to be accessed by the first container.

13. The non-transitory computer-readable storage medium according to claim 11, wherein the identifying of the reason is configured to in response that the operation history information corresponding to the first container is determined to be stored, determine whether the operation history information is first operation history information indicating that the first container is a container that has performed an operation related to execution of data synchronization in the past on the plurality of physical machines, and in response that the operation history information corresponding to the first container is the first operation history information, determine that the reason indicates that data is transferred to the first container, and the determining of the physical machine is configured to determine the physical machine on which the storage is mounted as the physical machine on which the first container is to be deployed.

14. The non-transitory computer-readable storage medium according to claim 13, wherein the first operation history information indicates that the first container is a container that has terminated abnormally in the past on the plurality of physical machines.

15. The non-transitory computer-readable storage medium according to claim 10, the processing further comprising: in response that a second container is started on the plurality of physical machines, determining whether the second container has been started in the past; and in response determining that the second container has not been started in the past, generating association information between the physical machine on which the second container is deployed and the physical machine on which a storage accessed by the second container is mounted, wherein the determining of the physical machine is configured to determine, by using the generated association information, the physical machine on which the storage is mounted as the physical machine on which the first container is to be deployed.

16. The non-transitory computer-readable storage medium according to claim 15, wherein
- the determining of whether the second container has been started in the past is configured to
- determine whether the association information corresponding to the second container is stored in the memory, and
- determine that the second container has been started in the past in response to determining that the association information corresponding to the second container is stored in the memory.

\* \* \* \* \*